(12) United States Patent
Dibble

(10) Patent No.: US 9,032,199 B1
(45) Date of Patent: May 12, 2015

(54) SYSTEMS, DEVICES, AND METHODS FOR CAPTURING INFORMATION, CREATING LOADABLE IMAGES, AND PROVIDING FOR RESTARTS IN A COMPUTER SYSTEM

(71) Applicant: Google Inc., Mountain View, CA (US)

(72) Inventor: Peter Cadwell Dibble, Bethel Park, PA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 13/729,876

(22) Filed: Dec. 28, 2012

(51) Int. Cl.
*G06F 15/177* (2006.01)
*G06F 9/44* (2006.01)

(52) U.S. Cl.
CPC .................... *G06F 9/4401* (2013.01)

(58) Field of Classification Search
USPC .......................................................... 713/1, 2
See application file for complete search history.

(56) References Cited

U.S. PATENT DOCUMENTS

| | | | |
|---|---|---|---|
| 5,933,838 A * | 8/1999 | Lomet ................................. | 1/1 |
| 6,766,471 B2 | 7/2004 | Meth | |
| 7,293,200 B2 | 11/2007 | Neary et al. | |
| 8,041,994 B2 | 10/2011 | Grinshpun et al. | |
| 8,078,910 B1 | 12/2011 | Backensto et al. | |
| 8,082,468 B1 | 12/2011 | Backensto et al. | |
| 8,122,280 B2 | 2/2012 | Ngan et al. | |
| 8,756,197 B1 * | 6/2014 | Wilde et al. .................... | 707/640 |
| 2005/0102396 A1 * | 5/2005 | Hipp ............................. | 709/224 |
| 2005/0198647 A1 * | 9/2005 | Hipp et al. ..................... | 719/310 |
| 2009/0327807 A1 | 12/2009 | Varadarajan et al. | |
| 2010/0115334 A1 * | 5/2010 | Malleck et al. ................. | 714/15 |
| 2012/0144232 A1 * | 6/2012 | Griffith et al. ............... | 714/4.12 |

* cited by examiner

*Primary Examiner* — Vincent Tran
(74) *Attorney, Agent, or Firm* — McDonnell Boehnen Hulbert & Berghoff LLP

(57) ABSTRACT

Embodiments relate to systems, devices, and computer-implemented methods for creating a loadable image and using the loadable image for restarting an application. The method can include starting, by a computing device, initialization of the application, and identifying upon initialization of the application, a plurality of resources associated with the application. The method can further include determining checkpoints associated with the plurality of resources. In addition, the method can include creating an optimized image corresponding to the application based on the checkpoints and an optimization of an application image, and storing the optimized image in a memory. Further, the method can include restarting the application by replacing a current process image with a new process image, and updating the new process image with one or more elements of the optimized image.

20 Claims, 4 Drawing Sheets

SYSTEMS, DEVICES, AND METHODS FOR CAPTURING INFORMATION, CREATING LOADABLE IMAGES, AND PROVIDING FOR RESTARTS IN A COMPUTER SYSTEM

TECHNICAL FIELD

The present disclosure relates to systems, devices, and methods for capturing information, creating loadable images, and providing for optimized restarts in a computer system and, more particularly, to systems, devices, and methods for capturing information related to an application or system, creating loadable restart images, and providing for optimized restarts using the loadable restart images when a system or application failure occurs.

BACKGROUND

In a checkpoint/restart system, the state of an application is periodically captured and stored throughout processing of the application. In the event of a system or application failure, the system or application can be restarted from the last-stored checkpoint. Capturing and storing checkpoints is one way of ensuring that long-running programs and high availability systems are able to recover and/or restart in the event of a system or application failure and/or fail-over.

SUMMARY

In accordance with aspects of the present disclosure, a computer-implemented method is disclosed for creating a loadable image and using the loadable image for restarting an application, comprising: starting, by a computing device, initialization of the application; identifying, by the computing device, upon initialization of the application, a plurality of resources associated with the application; determining checkpoints associated with the plurality of resources; creating an optimized image corresponding to the application based on the checkpoints and an optimization of an application image; storing the optimized image in a memory; restarting the application by replacing a current process image with a new process image; and updating the new process image with one or more elements of the optimized image.

In some aspects, the computer-implemented method can include wherein determining the checkpoints associated with the plurality of resources further includes: determining, after starting initialization of the application, the checkpoints associated with the plurality of resources.

In some aspects, the computer-implemented method can include wherein the restarting the application further includes: restarting, upon a failure of the application, the application by replacing the current process image with the new process image.

In some aspects, the computer-implemented method can further include: dumping in the memory, a dump image of the application after initialization.

In some aspects, the computer-implemented method can include wherein the restarting the application further includes: loading, from the memory, the dump image of the application.

In some aspects, the computer-implemented method can include wherein the restarting the application further includes: restarting the application using the dump image of the application that is loaded from the memory.

In some aspects, the computer-implemented method can include wherein the application includes one or more threads.

In accordance with aspects of the present disclosure, a tangible, computer-readable medium is disclosed having computer-readable instruction stored thereon, the computer-readable medium configured to, when executed by a processor, perform a method for creating a loadable image and using the loadable image for restarting an application, the method comprising: starting, by the processor, initialization of the application; identifying upon initialization of the application, a plurality of resources associated with the application; determining checkpoints associated with the plurality of resources; creating an optimized image corresponding to the application based on the checkpoints and an optimization of an application image; storing the image in a memory; restarting the application by replacing a current process image with a new process image; and updating the new process image with one or more elements of the optimized image.

In some aspects, the tangible, computer-readable medium has computer-readable instruction for performing a method further including: determining, after starting initialization of the application, the checkpoints associated with the plurality of resources.

In some aspects, the tangible, computer-readable medium has computer-readable instruction for performing a method, wherein the restarting the application further includes: restarting, upon a failure of the application, the application by replacing the current process image with the new process image.

In some aspects, the tangible, computer-readable medium has computer-readable instruction for performing a method further including: dumping, in the memory, a dump image of the application after initialization.

In some aspects, the tangible, computer-readable medium has computer-readable instruction for performing a method, wherein the restarting the application further includes: loading, from the memory, the dump image of the application.

In some aspects, the tangible, computer-readable medium has computer-readable instruction for performing a method, wherein the restarting the application further includes: restarting the application using the dump image of the application that is loaded from the memory.

In some aspects, the tangible, computer-readable medium has computer-readable instruction for performing a method, wherein the application includes one or more threads.

In accordance with aspects of the present disclosure, a computing system is disclosed for creating a loadable image and using the loadable image for restarting an application, the system comprising: at least one memory to store data and instructions; and at least one processor configured to access the at least one memory and to execute instructions to: start initialization of the application; identify, upon initialization of the application, a plurality of resources associated with the application; determine checkpoints associated with the plurality of resources; create an optimized image corresponding to the application based on the checkpoints and an optimization of an application image; store the optimized image in the at least one memory; restart the application by replacing a current process image with a new process image; and update the new process image with one or more elements of the optimized image.

In some aspects, the at least one processor is further configured to determine, after starting initialization of the application, the checkpoints associated with the plurality of resources.

In some aspects, when the at least one processor is configured to restart the application, the at least one processor is further configured to: restart, upon a failure of the application, the application by replacing the current process image with the new process image.

In some aspects, the at least one processor is further configured to dump, in the at least one memory, a dump image of the application after initialization.

In some aspects, the at least one processor is further configured to load, from the at least one memory, the dump image of the application.

In some aspects, when the at least one processor is configured to restart the application, the at least one processor is further configured to: restart the application using the dump image of the application that is loaded from the at least one memory.

DESCRIPTION OF DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Figure 1:
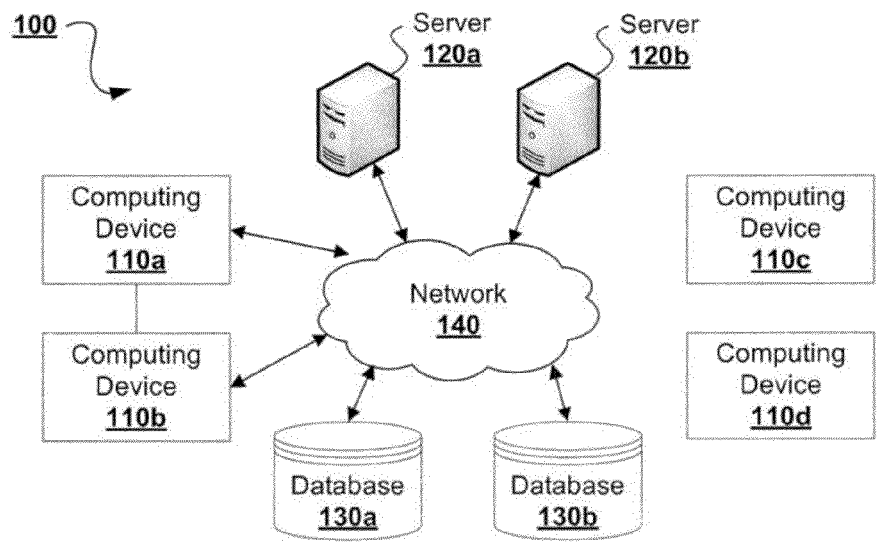
FIG. 1 is a block diagram of an example computing system arranged to capture information, create loadable images, and provide for optimized restarts, consistent with certain disclosed embodiments.

Embodiments of the present teachings generally relate to systems, methods, and devices for capturing information, creating loadable images, and providing for an optimized restart. More particularly, the disclosed embodiments relate to systems, methods, and devices for creating a loadable restart image by capturing and storing information related to a system and/or applications at startup, optimizing the captured information to create loadable images, and providing for optimized restarts in a computer system using the loadable restart image. The disclosed embodiments can be used, for example, in connection with systems or applications having processes that perform substantial programmatic initialization before they can be useful, such as, for example, processes that run on interpreters that load libraries at application startup.

The term "application," as used herein, can refer to individual applications or application groups. Individual application can consist of one or more processes and can be single-threaded or multi-threaded. Generally, an operating system can launch an application by creating the application's initial process and letting that initial process execute. This process is typically referred to as initialization. In some implementations, initialization may be defined as the phase of program execution before the freeze-dry checkpoint is recorded.

The two basic steps to starting a process on a Unix-like operating system (e.g., Linux, Solaris, etc.) are "fork( )" and "exec( )," and their variants, including, for example, "vfork( )," "forkall( )", "execl( )," "execlp( )," "execv( )," "execvp( )," etc. For Windows operating systems, "CreateProcess( )" and its variants can be used similarly. As used herein, the terms "fork( )" and "exec( )" are used to describe the similar or comparable functionality and functional variants across operating systems. However, neither implementations of the present technologies nor instances of the terms "fork( )" and "exec( )" as used herein are limited to UNIX or Windows operating systems.

"Fork( )" can be used to create a new process (i.e., child process), which can be the same as its calling process (i.e., parent process). "Fork( )" largely duplicates the parent process, leaving both the parent and child processes executing the same code independently of one another. The child process created by "fork( )" will have a unique process ID (PID). Generally, "fork( ) does not pass memory locks, record locks are not inherited, timers are zeroed, semaphores are modified, pending signals are dropped, outstanding asynchronous input/output (AIO) operations are dropped, and only one thread is passed.

"Exec( )" can be used to replace the current process image with a new process image. The new process image is constructed from a regular, executable file called the "new process image file." In other words, "exec( )" can overwrite the address space of the calling process. The PID, however, remains unchanged because a new process is not created. Generally, "exec( )" does not preserve threads, mapped memory, signal dispositions, shared memory, semaphores, mutexes, etc. When "fork( )" and "exec( )" are taken together, much data can be lost because some of the attributes of the original process are stripped away in the "fork( )," while most of the remaining attributes are stripped off by "exec( )." In addition, "fork( )" and "exec( )" cannot pass multiple executing threads and cannot support multi-threaded processes.

As used herein, the terms "checkpointing" and "checkpoint/restore systems" refer to techniques and systems employing techniques for creating fault tolerance in applications by capturing and storing application or system state information that can be used for restarting the applications, e.g., in case of failure. While applicable to multi-threaded processes and capable of restarting failed applications, traditional checkpoint/restore systems can waste memory due to the large amount of unused and/or unusable data that is stored. In addition, in traditional checkpoint/restore systems, applications can be slow to restart because a large amount of data is loaded from the stored file into RAM for the restart. As used herein, a checkpoint may include a resource, or complex of resources up to a complete system image, that can be preserved for later restoration, or may include the saved form of that checkpoint.

The disclosed embodiments can avoid the above-identified problems by using methods, executed in systems and devices, referred to herein as "freeze-dry," "freeze-dry service," "freeze-dry checkpoint," "freeze-dry optimization," and "thaw" that can capture system information, optimize the information into a loadable image, and restart the application using the loadable image. The loadable image produced by the freeze-dry and optimization processes can be smaller and more memory-efficient, and may not incur the overhead of the parent process. When called by "exec( )," the application starts in a runtime code that is efficient and performs the actions that could not be done in optimization or by the loader.

In some aspects, the disclosed embodiments can increase the time of startup processing to capture and optimize system information, resulting in a restart that is faster and a post-restart process that is lighter. That is, the disclosed embodiments may expend greater effort (e.g., time, system resources, power, etc.) before generating freeze-dry checkpoints in order to make freeze-dry optimization more effective. In other aspects, the disclosed freeze-dry, checkpoint, and optimization services can allow for a less expensive re-start phase (e.g., faster re-start, reduced use of system resources, lower power requirement, etc.).

Reference will now be made in detail to examples of embodiments of the present teachings, which are illustrated in the accompanying drawings. Where possible the same reference numbers will be used throughout the drawings to refer to the same or like parts. While several example embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure.

FIG. 1 is a block diagram of an example computing system arranged to capture information, create loadable images, and provide for optimized restarts, consistent with certain disclosed embodiments. It should be readily apparent to one of ordinary skill in the art that the example computing system depicted in FIG. 1 represents a generalized schematic illustration and that other components/devices can be added, removed, or modified. As shown in FIG. 1, system 100 can include one or more computing devices 110, including, for example, computing devices 110a, 110b, 110c, and 110d, one or more servers 120, including, for example, servers 120a and 120b, one or more databases 130, including, for example, databases 130a and 130b, and a network 140.

Computing devices 110 can be any type of electronic device and/or component configured to execute one or more processes, many of which are known in the art. Computing devices 110 can include, by way of example and not limitation, clients, desktop computers, laptop computers, network computers, workstations, personal digital assistants (PDA), tablet PCs, telephony devices, wireless base stations, wireless access devices, pagers, musical devices, routers, hubs, cameras, printers, copiers, scanners, projectors, alarms, lights, home entertainment systems, audio/visual systems, home security devices, intercoms, domestic robots, appliances, HVAC systems, etc., or any component or sub-component of another computing device 110 and/or assembly containing one or more computing devices 110 or their components or sub-components, such as, for example, a car, a train, a plane, a boat, etc. Although illustrated separately, computing devices 110 can also include servers, such as servers 120, and/or databases, such as databases 130. In some aspects, computing devices 110 can be configured to transmit and/or receive information to and/or from other computing devices 110, servers 120, and/or databases 130 directly and/or indirectly via any combination of wired and/or wireless communication systems, method, and devices.

Servers 120 can be physical computers, or computer systems, configured to run one or more services to support users of other computers on one or more networks and/or computer programs executing on physical computers, or computer systems, and configured to serve the requests of other programs (e.g., clients) that may be operating on one or more servers 120 or on other computing devices, such as computing devices 110. Servers 120 can include, by way of example and not limitation, communication servers, database servers, fax servers, file servers, mail servers, print servers, name servers, web servers, proxy servers, gaming servers, etc. In some aspects, servers 120 can be configured to transmit and/or receive information to and/or from computing devices 110, other servers 120, and/or databases 130 directly and/or indirectly via any combination of wired and/or wireless communication systems, method, and/or devices.

Databases 130 can be one or more computing devices configured to store databases, e.g., organized collections of data and their data structures, and/or execute database management systems, e.g., computer programs configured to control the creation, maintenance, and use of a database. Collectively, databases and their database management systems can be referred to as database systems. As used herein, database 130 can refer to databases, database management systems, and/or database systems. In some aspects, database 130 can be configured to store databases, while database management systems are stored and executed on one or more remote computing devices, such as computing devices 110, and/or one or more remote servers, such as servers 120. In one implementation, databases 130 can include software database programs configured to store data associated with servers 120 and their associated applications or processes, such as, for example, standard databases or relational databases. Databases 130 can include relationship database management systems (RDBMS) that may be configured to run as a server on servers 120. In some aspects, databases 130 can be configured to transmit and/or receive information to and/or from computing devices 110, servers 120, and/or other databases 130 directly and/or indirectly via any combination of wired and/or wireless communication systems, method, and/or devices.

Network 140 can be any appropriate network or other communication link that allows communication between or among one or more systems, networks, and/or devices, such as, for example, computing devices 110, servers 120, databases 130, or other networks (not shown). Network 140 may be wired, wireless, or any combination thereof. Network 140 may include, by way of example and not limitation, the Internet, a local area network, a wide area network, a WiFi network, a workstation peer-to-peer network, a direct link network, a Bluetooth connection, a bus, or any other suitable communication network.

Figure 2:
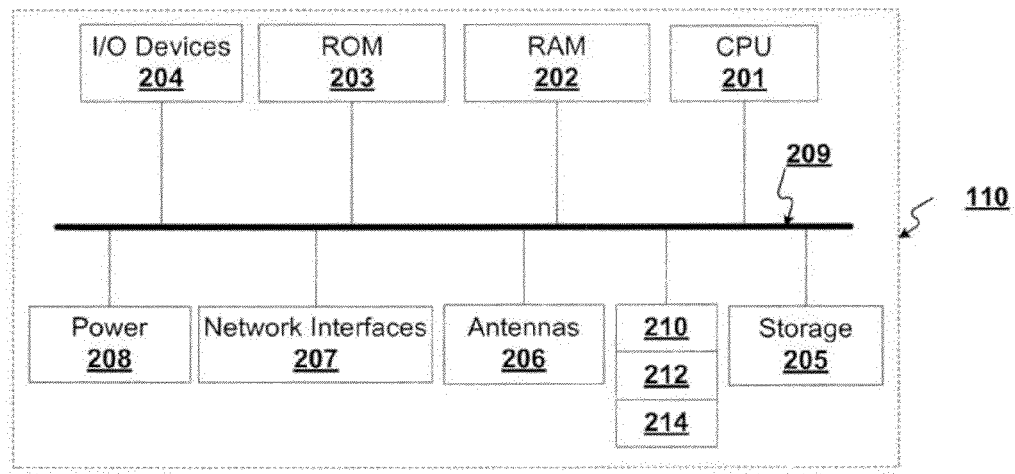
FIG. 2 is a block diagram of an example computing device arranged to capture information, create loadable images, and provide for optimized restarts, consistent with certain disclosed embodiments.

FIG. 2 is a block diagram of an example computing device 110 arranged to capture information, create loadable images, and provide for optimized restarts, consistent with certain disclosed embodiments. It should be readily apparent that the computing device 110 depicted in FIG. 2 represents a generalized schematic illustration and that other components/devices can be added, removed, or modified. Moreover, the example block of computing device 110 as depicted in FIG. 2 can be used to represent a server 120 and/or a database 130, as servers 120 and databases 130 are expressly included within the non-limiting examples of computing devices 110. In one example embodiment, computing device 110 can be configured to include address translation and full virtual-memory services.

As shown in FIG. 2, each computing device 110 can include one or more of the following components: at least one central processing unit (CPU) 201 configured to execute computer program instructions to perform various processes and methods; random access memory (RAM) 202 and read only memory (ROM) 203 configured to access and store data and information and computer program instructions; I/O devices 204 configured to provide input and/or output to computing device 110 (e.g., keyboard, mouse, display, speakers, printers, modems, network cards, etc.); and storage media 205 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system 210, application programs 212 including, for example, web browser application, email application and/or other applications, and data files 214 are stored.

In addition, each computing device 110 can include antennas 206; network interfaces 207 that provide wireless and/or wire line digital and/or analog interface to one or more networks, such as network 140, over one or more network connections (not shown); a power source 208 that provides an appropriate alternating current (AC) or direct current (DC) to power one or more components of computing device 110; and a bus 208 that allows communication among the various disclosed components of computing device 110 of FIG. 2. Each of these components is well-known in the art and will not be discussed further.

Although not shown, computing device 110 can include one or more mechanisms and/or devices by which computing device 110 can perform the methods as described herein. These mechanisms and/or devices can include any combination of hardware and/or software components and can be included, in whole or in part, in any of the components shown in FIG. 2.

In one or more exemplary designs of computing device 110 of FIG. 2, the functions described can be implemented in hardware, software, firmware, or any combination thereof. If implemented in software, the functions can be stored as one or more instructions or code on computer-readable medium, including the computer-readable medium described above (e.g., RAM 202, ROM 203, and storage media 205). Computer-readable media includes both non-transitory, tangible computer storage media and communication media including any medium that facilitates transfer of a computer program from one place to another. A storage media can be any available media that can be accessed by a general purpose or special purpose computer. By way of example, and not limitation, non-transitory, tangible computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Any connection can be termed a communication transfer media. For example, software that is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication transfer media. Combinations of the above should also be included within the scope of computer-readable media.

Figure 3:
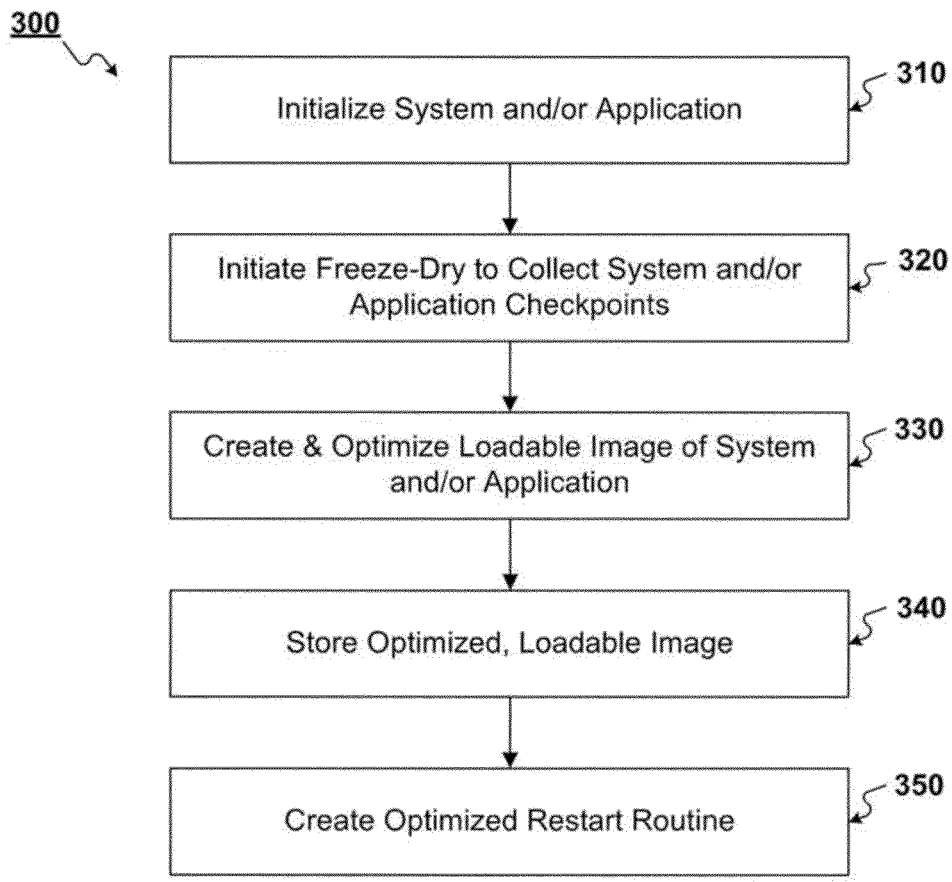
FIG. 3 is a flowchart illustrating an example process for capturing information, creating loadable images, and providing for optimized restarts, consistent with certain disclosed embodiments.

FIG. 3 is a flowchart illustrating an example process for capturing information, creating loadable images, and providing for optimized restarts, consistent with certain disclosed embodiments. Specifically, FIG. 3 illustrates a flowchart 300 consistent with example implementations of the present disclosure in which computing device 110 can initiate the freeze-dry service, create a freeze-dry optimized image, and generate the corresponding freeze-dry optimized restart routine.

As shown in FIG. 3, computing device 110 can initialize an application or system (310). The application or system initialized by computing device 110 can be operating on, or in connection with, computing device 110. In one aspect, initialization can include starting an application, such as operating system 210 and/or application 212, locating defined values typically stored in initialization files, such as data files 214, and using the located defined values for variable data used by the operating system 210 and/or application 212. In one example embodiment, application initialization can be performed in a heavily-instrumented and constrained mode, such that every resource and every reference to a resource is tracked so access to those resources can be evaluated when the freeze-dry service is called. Resources can include, for example, memory and the contents of memory, files, code, shared libraries, threads, locks, data queued for sending and/or receiving, signals, run times, etc.

At the desired time, computing device 110 can initiate the freeze-dry checkpoint process to collect system and/or application data (320). The freeze-dry checkpoint process may be called or initiated at any time, including during initialization or after initialization is complete. In one example embodiment, when the application, such as application 212, completes initialization, application 212 can call a freeze-dry library function. As another example, application 212 can, in some aspects, be instructed to avoid some initialization operations until after the freeze-dry is complete.

Computing device 110 can create a freeze-dry optimized loadable image of the system and/or application (330). In one example embodiment, to create the freeze-dry optimized loadable image, computing device 110 can additionally collect freeze-dry checkpoint data and other information, such as, for example, execution and system interaction traces collected by the inspection environment, a memory image created by the freeze-dry function, etc. In addition, in some embodiments, depending on the architecture and the format of the executable file, computing device 110 can collect additional information such as, for example, debugging information (e.g., dwarf), the symbol table from the compiler, parallel or substitute execution of the compiler's intermediate form (the target-independent phase of its output), etc.

Computing device 110 can store the freeze-dry optimized, loadable image (340). In one embodiment, computing device 110 can store the freeze-dry optimized, loadable image in a local storage, such as, for example, RAM 201, ROM 202, storage media 205, and/or data files 214. Additionally and/or alternatively, computing device 110 can store the freeze-dry optimized, loadable image in a remote storage area, such as, for example, RAM 201, ROM 202, and/or storage media 205 of one or more other computing devices 110, one or more servers 120, and/or one or more databases 130. Referring to FIG. 1, for example, server 120a may store a freeze-dry optimized, loadable image in any of computing devices 110, server 120b, and/or databases 130. As another example, computing device 110a may store a freeze-dry optimized, loadable image in any of computing device 110b, computing device 110c, computing device 110d, servers 120, and/or databases 130. In addition, computing device 110 can produce a report on the resources to determine if resources are being saved that will not be needed after the freeze-dry image is loaded, or resources are being discarded that will be needed following startup.

Computing device 110 can create a freeze-dry optimized restart routine (350). The freeze-dry optimized startup routine can restore the elements of the freeze-dry optimized state that are not adequately restored by the "exec( )" process (e.g., starting threads, adjusting any saved process IDs and any path numbers that could not be predicted at optimization time, adjusting the current location in files, lock state, etc.) This startup routine is constructed for the image, and may not be a standard library routine driven by data left by a traditional checkpoint process.

The term "freeze-dry optimized," as used herein, can refer to reduced resource (e.g., memory, open I/O paths, etc.) usage and faster processing in association with the disclosed systems, methods, and devices. The freeze-dry optimized restart routine can include, for example, creating a new address space, and memory mapping the recorded data and shared ranges into that address space. In some aspects, this can include reading the map, but may not involve reading all of the data at this time. In addition, the freeze-dry optimized restart routine can include lazily demand-paging data that is not currently resident as the reconstituted program needs it. Additionally, the freeze-dry optimized restart routine can include starting execution in a special startup routine that patches the image with any PID changes, shared library addresses, etc., and reconstituting all threads and patching the image with any thread number changes. If the threads were waiting for a lock when the freeze-dry service was called, the threads will restart waiting for those locks. Further, the freeze-dry optimized restart routine can include reconstituting the open files and patching the image with any path number changes, and reconstituting the signal handling for the process, all locks for the process, and any processor affinity to the extent possible. Where it is not possible to reconstitute processor affinities, the optimized restart routine can include allowing the threads to run without affinity. Moreover, the freeze-dry optimized restart routine can include releasing the locks for which the threads are waiting, and transferring control to a function designated by the freeze-dry function call.

In some embodiments, if there is library code to be executed to fully-initialize the process, it can be executed by the freeze-dry library before control returns to the application. At this time, all threads may be running and the thread regenerated from the thread that called the freeze dry service can execute any remaining code to complete initialization. Remaining code can include, for example, any resource allocation and initialization that could not pass through the freeze-dry/thaw process.

Figure 4:
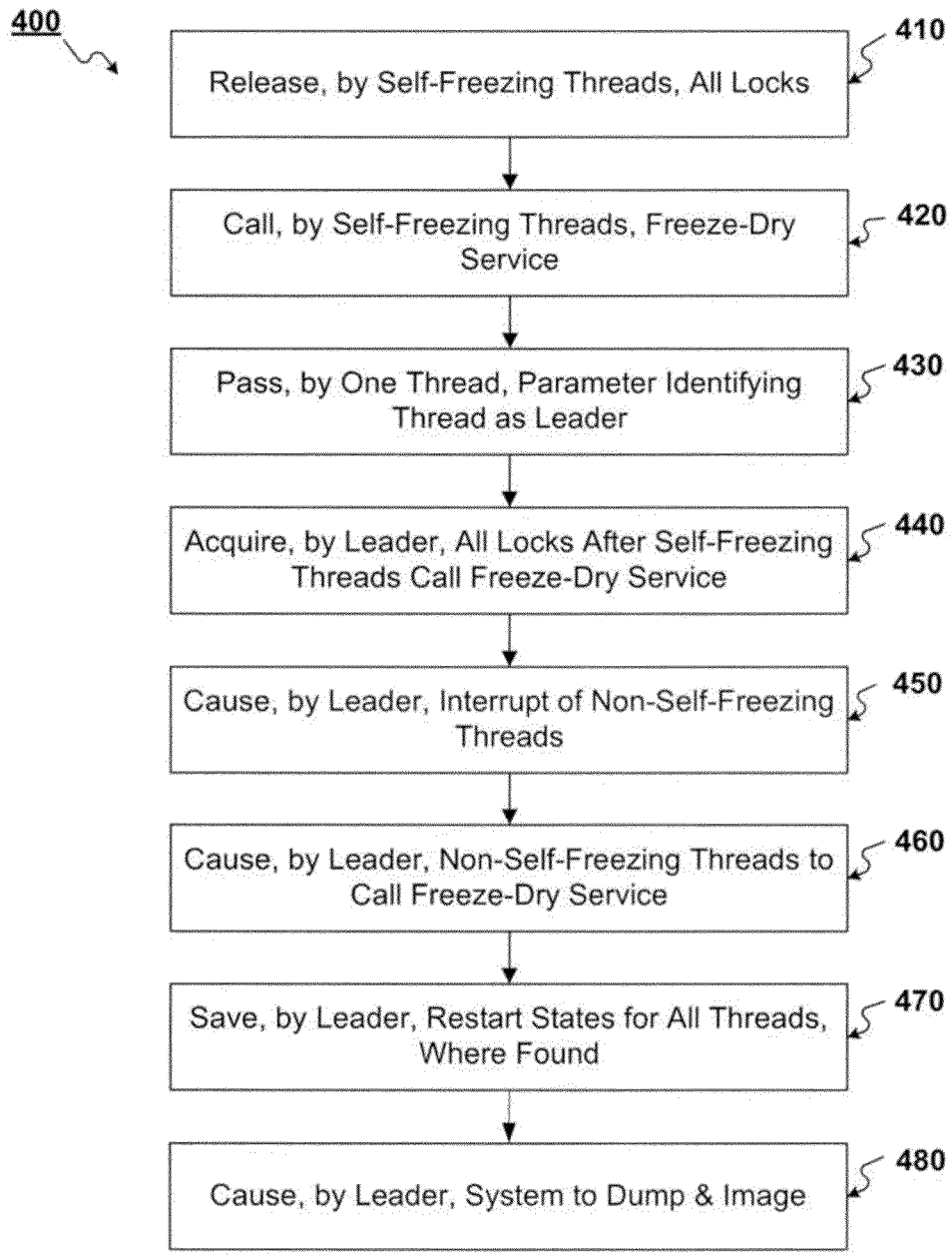
FIG. 4 is a flowchart illustrating an example freeze-dry service used for capturing information, creating loadable images, and providing for optimized restarts, consistent with certain disclosed embodiments.

FIG. 4 is a flowchart illustrating an example freeze-dry service for capturing information, creating loadable images, and providing for optimized restarts, consistent with certain disclosed embodiments. Specifically, FIG. 4 illustrates a flowchart 400 consistent with example implementations of the present disclosure in which computing device 110 can perform the freeze-dry service. Referring to the process illustrated by flowchart 400, an application can include many threads, and every thread of the application can be marked with meta-data.

As shown in FIG. 4, when self-freezing threads are ready to execute the freeze-dry service, the self-freezing threads can release all locks (410). In some embodiments, a self-freezing thread can be a thread configured to call the freeze-dry service. In some aspects, some threads can be waiting on a lock either in the operating system or out of it, while other threads can be executing, while still other threads can be runnable but not executing. The freeze-dry service can cause every self-freezing thread that is executing or executable to pause for a freeze-dry operation by causing them to wait on a lock that is already held by the freeze-dry code. This can be done, for example, using a process that operates similarly to a signal intercept routine that waits on that lock and then releases it, but does not disturb any use of signals outside the freeze-dry runtime.

The self-freezing threads can call the freeze-dry service (420). The freeze-dry service can include a freeze-dry checkpoint function. The freeze-dry checkpoint function can behave like a jump to a function (e.g., specified by a parameter and pointer argument to the freeze-dry checkpoint function) that cannot return to the point of the freeze-dry checkpoint. In some aspects, this can remove the call tree of the freeze-dry checkpoint from automatic inclusion in the reachable code.

One thread of the self-freezing threads can pass a parameter, identifying that thread as the leader (430). When the self-freezing threads have all called the freeze-dry service, the leader can acquire all locks (440). The leader can interrupt all threads that are not self-freezing (450), and cause those threads to call the freeze-dry service (460). The freeze-dry service can ensure that every thread has a lock. In some embodiments, every thread can be waiting for a lock that is held by the freeze-dry library code.

The freeze-dry checkpoint service can include different actions for different resources. As an example, for memory that is mapped for read/write (R/W), the freeze-dry checkpoint service can record the addresses and contents of the memory ranges. For memory that is mapped for read-only or execute, the freeze-dry checkpoint service can record a virtual address associated with the memory and the source of the data (e.g., file, shared library, etc.). Any memory that is inaccessible when the freeze-dry checkpoint service is called can remain inaccessible for the rest of execution, it may not be allocated on thaw, and its contents may not be preserved. Memory tracking also permits dynamically allocated memory to be compacted so all allocations can be contiguous or, more generally, can be optimized for the memory allocator.

In some embodiments, identifying pointers can be accomplished through static analysis, such as, for example, if the source language and debugging information can identify stored pointers. If not, the system can track pointers from the malloc/system call, or machine instructions that generate them through all the places they are stored.

For files, the freeze-dry checkpoint service can record the contents of the system path table for that process, including, for example, number, path, current offset, access mode, any signals associated with the file, etc. Also, the freeze-dry checkpoint service can identify each place where a path number has been stored so that the location can be updated with the new path number on thaw. Any file that is open but inaccessible at the freeze-dry checkpoint service may not need to be re-opened on thaw.

For threads, the freeze-dry checkpoint service can record the thread number and name, a complete register set, and other system information such as, for example, its thread cancellation state, processor affinity, etc. In some embodiments, threads that are executing are an optimizable resource. The freeze-dry checkpoint service can record, for every other item of process or thread, all states except that which is modifiable by other processes or the system in ways that would be visible to the freeze dried program. In some embodiments, values and/or states that are under control of the freeze-dry service can be saved as constants, and provide more powerful optimization. In other embodiments, values and/or states influenced by outside entities (e.g., system processes or other processes) may not be saved as constants, and may be re-evaluated after thaw. In still further embodiments, write-protected and executable input files can be treated as constants even though they are external. If a thread has no useful code-path forward from the thaw state (for example, the thread cannot do anything visible after the image is thawed), the freeze-dry checkpoint service may not save the thread information, and the thread may not be thawed.

The freeze-dry checkpoint service may not record code or data which may be unreachable from the thaw state. Instead, code or data which may be unreachable from the thaw state can be compressed out of the saved image. The freeze-dry checkpoint service can optimize some code by converting variables to constants, removing branches that go around dead code, etc. The freeze-dry checkpoint process can record the state of running timers. For each signal, the freeze-dry checkpoint service can record the system information, including, for example, its state, the address of the signal handler, etc. The freeze-dry service may not record any pending signals, data queued for sending or receiving, or the state of queues.

The freeze-dry checkpoint service can record which locks each thread currently holds and which locks each thread is currently waiting on. If possible, the freeze-dry checkpoint service can store locks between threads in the application to be restored on thaw. If it is not possible for the freeze-dry checkpoint service to store locks between threads, the freeze-dry checkpoint service can acquire all locks in their canonical order, thus ensuring that all other threads have released all locks. If the thaw operation is configured to restore locks, the thaw code can be configured to release the locks in reverse order. The application can hold locks on outside resources at the time the freeze-dry checkpoint service executes. If the application holds locks on outside resources, the thaw code can restart the threads waiting for locks on outside resources at the wait. In some aspects, in conjunction with the operating system, the thaw code can restore lock state for other threads by acquiring locks on their behalf. For example, the application may cause the master thread to acquire all locks in canonical order, initiate the freeze-dry checkpoint service, restore the master thread with the acquired locks, cause the other threads to begin running, and release the locks acquired by the master thread in reverse order.

Where found, the leader can save restarts for all threads (470). The leader can cause the system to dump and image the data stored by the freeze-dry service (480). In some aspects, the leader can cause the application to crash itself, leaving a "dump" image that could be restarted in a way that would pick up right after the code that caused the crash, such as, for example, by use of "exec( )."

Figure 5:
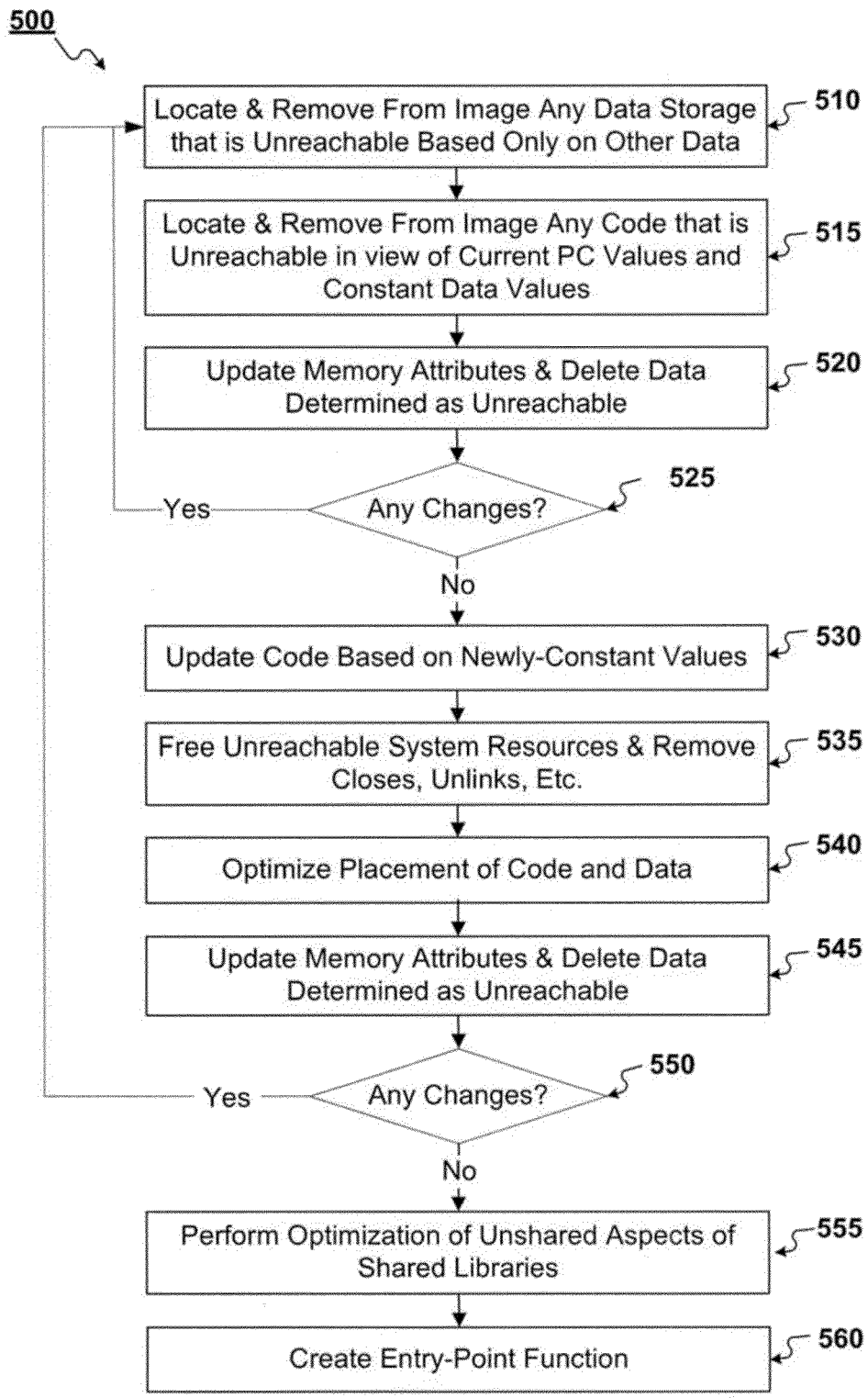
FIG. 5 is a flowchart illustrating an example optimization service used for capturing information, creating loadable images, and providing for optimized restarts, consistent with certain disclosed embodiments.

FIG. 5 is a flowchart illustrating an example process for capturing information, creating loadable images, and providing for optimized restarts, including an example freeze-dry optimization service, consistent with certain disclosed embodiments. Specifically, FIG. 5 illustrates a flowchart 500 consistent with example implementations of the present disclosure in which computing device 110 can perform the freeze-dry optimization service, following the freeze-dry checkpoint service. The freeze-dry optimization service can include, for example, performing statistical analysis of the loadable image to identifying any unreachable resources, such as memory, files, threads, etc., and removing from the image those resources identified as unreachable. In addition, the freeze-dry optimization service can include, identifying resources that are reachable but never used, such as, for example, open files, shared libraries, threads, etc., and removing from the image those resources identified as reachable but unused.

As shown in flowchart 500 of FIG. 5, the freeze-dry optimization service can include locating and removing from the loadable image any data storage that is unreachable based only on other data (510). For example, the freeze-dry optimization service can locate and remove data that is dynamically allocated and to which there is no pointer. As also shown in flowchart 500, the freeze-dry optimization service can also include locating and removing from the loadable image any code that is unreachable based on current PC values and constant data values (515).

The freeze-dry optimization service can include updating memory attributes, marking data as unreachable or constant based on pointers and code analysis, and deleting data determined to be unreachable (520). For example, the freeze-dry optimization service can include deleting static and stack data. If there were any deletions or changes made (525, Yes), the freeze-dry optimization service can again locate and remove from the loadable image any data storage that is unreachable based only on other data (510). Data that is constant can be saved and/or restored as constant data, and therefore may not be deleted. In some cases, the constant data can be incorporated in the code and removed from the data area. If there were no deletions or changes made (525, No), the freeze-dry optimization service can include updating code based on newly-constant values (530). For example, conditional branches can be updated to unconditional branches, loads can become load-immediates, etc.

The freeze-dry optimization service can include freeing unreachable system resources (535). Unreachable system resources may include, for example, open files, shared libraries, etc. In addition, when freeing unreachable system resources, the freeze-dry optimization service can include removing closes, unlinks, etc. With respect to shared libraries, the freeze-dry optimization service may not cause the shared library to be re-linked if analysis can show that a shared library is unreachable from the restart state and it may not need to be re-linked on restart.

The freeze-dry optimization service can include optimizing placement of code and data (540). For example, the freeze-dry optimization service can include shortening branches, putting code that is used together in the same page in memory and, where possible, in the same cache line, etc. In addition, the freeze-dry optimization service can include putting data that is used together in the same page in memory and, where possible, in the same cache line, etc.

The freeze-dry optimization service can again include updating memory attributes, marking data as unreachable or constant based on pointers and code analysis, and deleting data determined to be unreachable (545), including, for example, deleting static and stack data. If any deletions or changes were made (550, Yes), the freeze-dry optimization service can again locate and remove from the loadable image any data storage that is unreachable based only on other data (510). Data that is constant can be saved and/or restored as constant data, and therefore may not be deleted. In some cases, the constant data can be incorporated in the code and removed from the data area. If no deletions or changes were made (550, No), the freeze-dry optimization service can include performing optimization of unshared aspects of shared libraries, e.g., dynamic linked libraries (530). Finally, the freeze-dry optimization service can include creating an entry-point function that opens files, starts threads, links libraries, etc.

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood, all language such as "up to," "at least," "greater than," "less than," and the like include the number recited and refer to ranges which can be subsequently broken down into subranges as discussed above. Finally, as will be understood, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent. The various aspects and embodiments disclosed herein are for purposes of illustration and are not intended to be limiting, with the true scope and spirit being indicated by the following claims.

What is claimed is:

1. A computer-implemented method for creating a loadable image and using the loadable image for restarting an application, comprising:
    starting, by a computing device, initialization of the application;
    identifying upon initialization of the application, a plurality of resources associated with the application;
    determining checkpoints associated with the plurality of resources;
    based on the checkpoints, determining memory usage of the application;
    creating an optimized image corresponding to the application based on the checkpoints and an optimization of an application image for the memory usage of the application, wherein the optimized image uses reduced resources of the plurality of resources and avoids preserving contents of all memory related to the memory usage of the application;
    storing the optimized image in a memory;
    restarting the application by replacing a current process image with a new process image;
    removing, within the optimized image, unreachable system resources in view of a current system state; and
    updating the new process image with one or more elements of the optimized image.

2. The computer-implemented method of claim 1, wherein determining the checkpoints associated with the plurality of resources further includes:
    determining, after starting initialization of the application, the checkpoints associated with the plurality of resources.

3. The computer-implemented method of claim 1, wherein restarting the application further includes:
    restarting, upon a failure of the application, the application by replacing the current process image with the new process image.

4. The computer-implemented method of claim 1, further including:
   dumping in the memory, a dump image of the application after initialization.

5. The computer-implemented method of claim 4, wherein the restarting the application further includes:
   loading, from the memory, the dump image of the application.

6. The computer-implemented method of claim 5, wherein the restarting the application further includes:
   restarting the application using the dump image of the application that is loaded from the memory.

7. The computer-implemented method of claim 1, wherein the application includes one or more threads.

8. A non-transitory machine-readable storage medium having computer-readable instruction stored thereon, the computer-readable medium configured to, when executed by a processor, perform a method for creating a loadable image and using the loadable image for restarting an application, the method comprising:
   starting, by the processor, initialization of the application;
   identifying upon initialization of the application, a plurality of resources associated with the application;
   determining checkpoints associated with the plurality of resources;
   based on the checkpoints, determining memory usage of the application;
   creating an optimized image corresponding to the application based on the checkpoints and an optimization of an application image for the memory usage of the application, wherein the optimized image uses reduced resources of the plurality of resources and avoids preserving contents of all memory related to the memory usage of the application;
   storing the optimized image in a memory;
   restarting the application by replacing a current process image with a new process image;
   removing, within the optimized image, unreachable system resources in view of a current system state; and
   updating the new process image with one or more elements of the optimized image.

9. The non-transitory machine-readable storage medium of claim 8, wherein determining the checkpoints associated with the plurality of resources further includes:
   determining, after starting initialization of the application, the checkpoints associated with the plurality of resources.

10. The non-transitory machine-readable storage medium of claim 8, wherein the restarting the application further includes:
   restarting, upon a failure of the application, the application by replacing the current process image with the new process image.

11. The non-transitory machine-readable storage medium of claim 8, the method further including:
   dumping, in the memory, a dump image of the application after initialization.

12. The non-transitory machine-readable storage medium of claim 11, wherein the restarting the application further includes:
   loading, from the memory, the dump image of the application.

13. The non-transitory machine-readable storage medium of claim 12, wherein the restarting the application further includes:
   restarting the application using the dump image of the application that is loaded from the memory.

14. The non-transitory machine-readable storage medium of claim 8, wherein the application includes one or more threads.

15. A computing system for creating a loadable image and using the loadable image for restarting an application, the system comprising:
   at least one memory to store data and instructions; and
   at least one processor configured to access the at least one memory and to execute instructions to:
      start initialization of the application;
      identify, upon initialization of the application, a plurality of resources associated with the application;
      determine checkpoints associated with the plurality of resources;
      based on the checkpoints, determine memory usage of the application;
      create an optimized image corresponding to the application based on the checkpoints and an optimization of an application image for the memory usage of the application, wherein the optimized image uses reduced resources of the plurality of resources and avoids preserving contents of all memory related to the memory usage of the application;
      store the optimized image in the at least one memory;
      restart the application by replacing a current process image with a new process image;
      removing, within the optimized image, unreachable system resources in view of a current system state; and
      update the new process image with one or more elements of the optimized image.

16. The computing system of claim 15, wherein the at least one processor is further configured to:
   determine, after starting initialization of the application, the checkpoints associated with the plurality of resources.

17. The computing system of claim 15, wherein when the at least one processor is configured to restart the application, the at least one processor is further configured to:
   restart, upon a failure of the application, the application by replacing the current process image with the new process image.

18. The computing system of claim 15, wherein the at least one processor is further configured to:
   dump, in the at least one memory, a dump image of the application after initialization.

19. The computing system of claim 18, wherein the at least one processor is further configured to:
   load, from the at least one memory, the dump image of the application.

20. The computing system of claim 19, wherein when the at least one processor is configured to restart the application, the at least one processor is further configured to:
   restart the application using the dump image of the application that is loaded from the at least one memory.

* * * * *